Oct. 30, 1962 J. D. GADDIE 3,061,094
BEAN GRADING APPARATUS
Filed Jan. 29, 1960 2 Sheets-Sheet 1
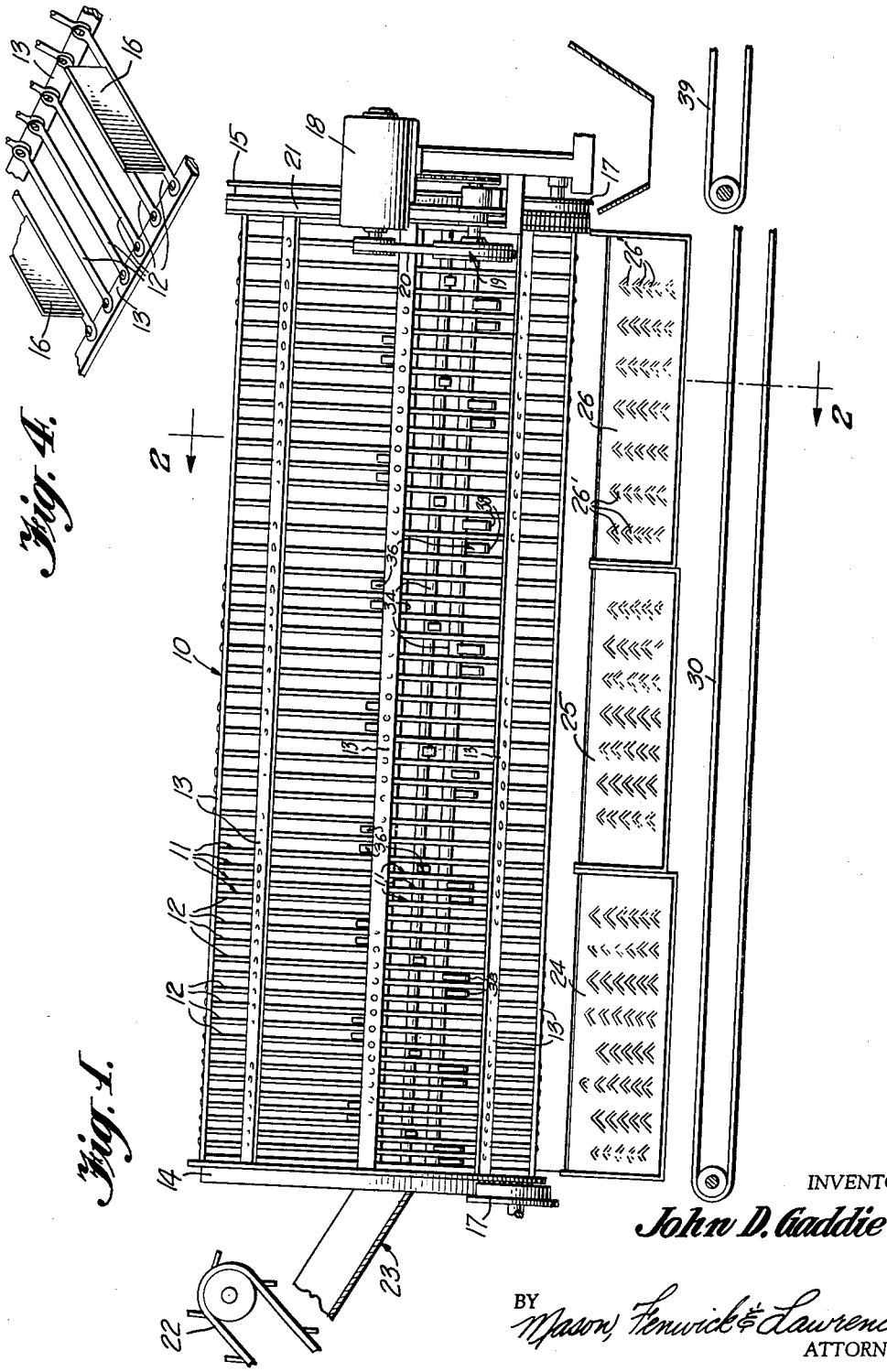
INVENTOR
John D. Gaddie
BY Mason, Fenwick & Lawrence
ATTORNEYS Oct. 30, 1962 J. D. GADDIE 3,061,094
BEAN GRADING APPARATUS
Filed Jan. 29, 1960 2 Sheets-Sheet 2
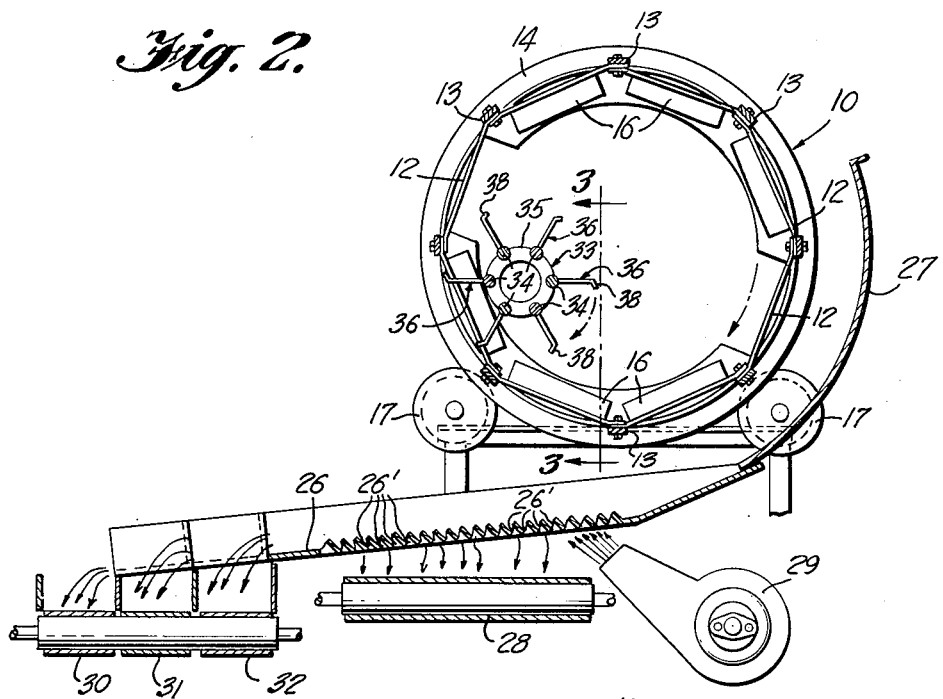
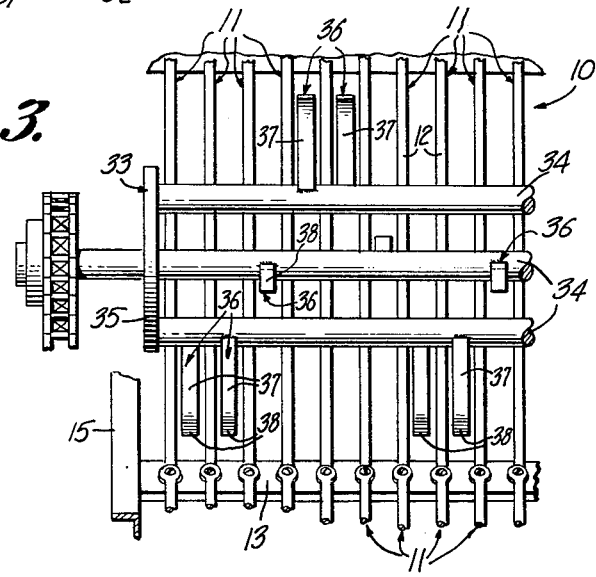
INVENTOR
John D. Gaddie
BY Mason, Fenwick & Lawrence
ATTORNEYS

United States Patent Office 3,061,094
Patented Oct. 30, 1962

3,061,094
BEAN GRADING APPARATUS
John D. Gaddie, 1258 Park St., Bowling Green, Ky.
Filed Jan. 29, 1960, Ser. No. 5,415
4 Claims. (Cl. 209—12)

The present invention relates in general to rotary graders, and more particularly to bean grading machines for sizing string beans according to their size or thickness.

Bean graders of this general type have been previously provided for the purpose of sizing string beans according to their thickness, but these have been complicated in design and their effective operation has been hampered by the lodging of clusters of beans which stick together in the grading devices. Additionally, bean graders of the type heretofore available on the market have not achieved the desired cleaning of the beans during the grading operation.

An object of the present invention is the provision of a novel bean grading machine for grading string beans according to thickness, which is capable of operating with greater efficiency by minimizing clogging of the grading devices with bean clusters.

Another object of the present invention is the provision of a novel bean grading machine having a series of grading rings arranged in a form of a drum between which beans of selected sizes are discharged from the interior of the drum, together with means for periodically dislodging clusters of beans without breaking the beans, and thus separating them for effective grading.

Another object of the present invention is the provision of a novel bean grading machine of simplified design having means for effectively cleaning the beans by separating debris therefrom during the grading operation.

Other objects, advantages and capabilities of the present invention will become apparent from the following detailed description taken in conjunction with the accompanying drawings illustrating one preferred embodiment of the invention.

In the drawings:

FIGURE 1 is a side elevation is somewhat diagrammatic form of the principal components of a bean grading machine embodying the present invention;

FIGURE 2 is a vertical transverse section view taken along the line 2—2 of FIGURE 1;

FIGURE 3 is a fragmentary section view to enlarged scale taken along the line 3—3 of FIGURE 2; and FIGURE 4 is a fragmentary perspective view of a portion of the grading drum.

Referring to the drawings wherein like reference characters designate corresponding parts throughout the several figures, the bean grading machine of the present invention comprises an outer grading drum 10 constructed in general in a similar manner to bean grading drums of prior art machines and comprising a series of axially spaced bean grading rings, indicated by the reference character 11, arranged in parallel planes spaced along the axis of the drum 10 and formed in the specific embodiment herein described of rectilinear rod sections 12 secured at their opposite ends to longitudinal framing bars 13 extending between annular end plates 14 and 15 at the feed and discharge ends, respectively, of the drum 10. At suitably spaced intervals axially along the drum 10, for example, at every fifth grading ring 11, the rod sections 12 are provided with radially inwardly projecting fins 16, in desired patterns arranged circumferentially about the drum in a manner which is well known to persons skilled in the art.

The outer bean grading drum 10 is supported for rotation in a conventional manner by suitable rollers 17 engaging the end plates 14, 15 at suitable points along the lower zones thereof spaced symmetrically relative to the vertical plane through the axis of the drum 10, the rollers 17 at opposite ends being located to dispose the drum 10 on an axis which inclines downwardly from the feed end. The drum 10 is driven in a clockwise direction as viewed in FIGURE 2 by suitable means such as the electric motor 18 and a speed reduction pulley unit 19 driven from the shaft of the motor 18 by the belt 20 and driving the end plate 15 by the belt 21. Quantities of beans are delivered to the feed end of the grading drum 10 in a conventional manner as by an endless belt conveyor 22 and a feed chute or hopper 23 adjacent to the feed end plate 14.

The sizing of the beans is accomplished by appropriate spacing of the bean grading rings 11 formed by the rod sections 12 axially of the drum 10, the arrangement in the preferred embodiment herein illustrated being such that three sizes of beans are graded through the periphery of the grading drum 10 to fall into a series of shaker sieves indicated by the reference characters 24, 25 and 26 disposed below the grading drum 10 to receive the beans falling between the grading rings 11. In the zone above the sieve 24, the rod sections 12 forming the grading rings 11 are spaced closest together to permit only the smallest selected size of beans to fall through, the grading rings 11 in the zone above the sieve 25 being spaced a greater distance apart for the next larger size of beans, and the grading rings in the zone above the sieve 26 being spaced to permit the next larger size of beans to fall through. A suitable curved baffle plate 27 may surround a portion of the outer periphery of the grading drum 10 to direct beans which fall through the spaces between the grading rings into the appropriate shaker sieves. The shaker sieves are provided with openings 26' of approximately one-half inch through which stones of sufficiently small size may fall onto a suitable conveyor 28, and blow fans 29 are disposed below the shaker sieves 24, 25 and 26 and are set at approximately a 45° angle to blow air through the openings 26' in the shaker sieves and blow off any dust, leaves, and light debris which fall through the grading rings 11 onto the shaker sieves. The shaker sieves 24, 25 and 26 have discharge ends overlying conveyors 30, 31 and 32 to carry away the beans of the different graded sizes for further processing.

In order to prevent clusters of the beans from clogging the spaces between the fins 16 and the rod sections 12 forming the grading rings 11, a skeleton drum 33 is disposed within the outer grading drum 10 on an axis paralleling and spaced eccentrically from the axis of the outer drum 10 and comprises, in the preferred embodiment, a series of six pipes 34 fixed at their ends in suitable circular end plates 35 and arranged uniformly circumferentially about a cylindrical path. A series of spring arms 36 are fixed at their inner ends to the pipes 34 and have a radially outwardly extending shank section 37, and a forwardly projecting finger 38 bent at right angles to the shank section 37 and extending in the direction of rotation of the skeleton drum 33. The skeleton drum 33 is positioned relative to the outer drum 10 so that the periphery of the skeleton drum is closely adjacent the inner edges of the fins 16, and the shanks of the spring arms 36 are longer than the depth of the fins 16, for example about six to seven inches, so that the spring arms 36 will project fully through the spaces between the rod sections 12 forming the grading rings 11. The spring arms 36 are arranged in a spiral fashion along the series of pipes 34 and the skeleton drum 33 is driven, for example by a sprocket fixed to one of the end plates 35 coupled by a chain with a suitable drive sprocket, at twice the speed of the outer grading drum 10.

In the operation of the present invention, the beans are deposited in the outer grading drum 10 through the feed end thereof and the end plate 14 by means of the conveyor 22 and chute 23. As the outer grading drum 10 rotates in a clockwise direction, as viewed in FIGURE 2, the beans are progressively elevated towards the top of the grading drum 10 by the fins 16 and by projection of portions of the beans through the spaces between the rod sections 12 and into contact with the framing bars 13, and then fall by gravity onto the lower portion of the outer grading drum. The beans of sufficiently small width to pass through the spaces between the rod sections 12 in the zone above the shaking sieve 24 fall onto the shaker sieve and the larger beans gravitate gradually toward the discharge end of the drum 10 due to the inclination of the axis of the drum 10. The axis of the drum is adjustable as to tilt to obtain the proper volume.

In the grading of the beans, loose beans will be graded very easily as they will fall freely to the bottom of the outer grading drum 10 during rotation of the drum. However, beans which are stuck together in groups, called clusters, there always being a large number of such bean clusters, will stick to the fins 16 and be conveyed to the top of the drum 10 where they will be dropped onto the skeleton drum 33 and the spring arms 36 thereof which will contact and disengage the clusters without breaking the beans. The spring arms 36 also will protrude through the spaces between the rod sections 12 forming the grading rings 11 to clear these spaces which would otherwise become clogged and prevent the beans from passing therethrough. The spring arms 36 are set in the spiral fashion hereinbefore mentioned to avoid tearing of the beans when bean clusters are engaged by the spring arms.

The beans of different sizes will be graded out by the different sections of grading rings 11 along the length of the grading drum 10, or of a plurality of such grading drums, arranged in series, while stones, vines, sticks and the like which are too large or are of such a character that they will not pass through the grading ring 11 will be transferred to the discharge end of the grading drum 10 and deposited through the discharge end at the end plate 15 onto a suitable conveyor 39.

When the beans are graded out of the outer grading drum 10, they fall into the shaker sieves 24, 25 and 26 which are inclined downwardly and vibrated to cause the beans to move to the left as viewed in FIGURE 2 to the conveyors 30, 31 and 32. The high speed air discharged by the fans 29 blowing through the openings in the shaker sieves 24, 25 and 26 blow off the dust, leaves and the like which have not otherwise been removed. Any stones that are less than seven-sixteenth inch in diameter or other trash of sufficiently small size to pass through the spaces between the grading rings 11 will pass through the openings in the shaker sieves 24, 25 and 26, which are approximately one-half inch, and fall onto the conveyor 28 to be carried away.

It will be apparent that by the provision of the skeleton drum 33 having the spring arms 36 projecting between the axially spaced sets of fins 16 and the rod sections 12 forming the grading rings 11, which are continuously moved relative to the outer grading drum 10 in the direction of travel of the drum 10, bean clusters are being continuously dislodged from the spaces between the fins 16 and grading rings 11 and separated into individual beans without breaking the beans, thereby preventing jamming of the spaces between the grading rings and ultimate loss of the grading function of the machine. The herein described arrangement provides a relatively simple construction which can be economically manufactured and serviced and which will give long and reliable use in the field.

While but one preferred embodiment of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:
1. In a string bean grader, the combination of an outer rotary drum having a feed end and a discharge end, means supporting said outer drum for rotation about its axis, the periphery of said outer drum comprising a plurality of axially spaced grading rings extending over substantially the length of the outer drum and having sized circumferentially elongated openings therebetween permitting passage of string beans of selected widths therethrough, means for rotating said outer drum, radially inwardly projecting means on said grading rings for engaging clusters of beans to elevate the bean clusters during rotation of said outer drum to a position adjacent the top of the outer drum and then gravitationally discharge the elevated bean clusters downwardly within the outer drum, an inner drum of smaller diameter than the radius of said outer drum disposed within said outer drum for rotation about an axis paralleling and eccentrically located relative to the axis of said outer drum to lie adjacent a limited arcuate segment of the outer drum along which beans are elevated, means for rotating said inner drum at a greater peripheral speed than said outer drum, and said inner drum having a series of radially outwardly projecting resilient spring members thereon of sufficient length to project fully through the sized openings of said outer drum in the portion thereof adjacent the inner drum, said spring members being swept during rotation of the inner drum through a path progressing circumferentially through a portion of the length of said sized openings to resiliently engage and dislodge bean clusters and beans which may be caught in said sized openings.

2. In a string bean grader, the combination of an outer rotary drum having an open feed end and a discharge end, means supporting said outer drum for rotation about its axis, the periphery of said outer drum comprising a plurality of axially spaced grading rings extending over substantially the length of the outer drum and having sized circumferentially elongated openings therebetween permitting passage therethrough of string beans of selected widths increasing in the direction of said discharge end, means for rotating said outer drum about said axis, a plurality of radially inwardly projecting fins extending inwardly from some of said grading rings for engaging beans and bean clusters within said outer drum and elevating the same to positions adjacent the top of the outer drum where the beans and bean clusters are gravitationally discharged downwardly within the outer drum, an inner drum of smaller diameter than the radius of said outer drum disposed within said outer drum for rotation about an axis parallel to and spaced radially from the axis of said outer drum to dispose the inner drum to one side of a vertical plane through the center of the outer drum in juxtaposed relation to a segment of the outer drum periphery along which beans are elevated, means for rotating said inner drum at a greater peripheral speed than said outer drum, and said inner drum having a series of radially outwardly projecting resilient spring fingers thereon spaced axially and circumferentially of said inner drum to sweep between said fins and having a length to protrude through each of said sized openings in said outer drum as the sized openings advance through said selected zone to resiliently engage and dislodge beans and bean clusters in the path thereof caught in said sized openings and spaces between said fins and to separate bean clusters to present individual beans to said grading rings.

3. In a string bean grader, the combination of an outer rotary drum having an open feed and a discharge end, means for supplying beans to said feed end, means supporting said outer drum for rotation about its axis with the feed end elevated slightly relative to the discharge end to progressively displace beans along the length of said outer drum toward said discharge end, the periphery of said outer drum comprising a circumferentially spaced series of elongated, longitudinally extending frame bars disposed parallel to the axis of the outer drum and a plurality of circumferentially extending, axially spaced rods extending between said frame bars and forming a plurality of axially spaced grading rings having sized circumferentially elongated openings between adjacent pairs of said rods and bars permitting passage of string beans of selected widths therethrough, said grading rings being arranged in groups providing sized openings of progressively increasing widths in the direction of said discharge end, means for rotating said outer drum about its axis, radially inwardly projecting fins extending inwardly from circumferentially aligned groups of said rods at intervals spaced axially of said outer drum for engaging beans and bean clusters in the lower region of said outer drum and elevating the same to an upper region wherein they are gravitationally discharged downwardly within the outer drum of smaller diameter than the radius of said outer drum, an inner drum to one side of a vertical plane through the center of the outer drum disposed within said outer drum for rotation about an axis parallel to and spaced radially from the axis of said outer drum at a position closely adjacent the ascending paths of said fins, means for rotating said inner drum at a greater peripheral speed than said outer drum, and a helically arranged series of radially outwardly projecting spring wire fingers on said inner drum spaced axially thereof to sweep between said axially spaced fins and having a length to protrude through each of the sized openings of said outer drum as the openings advance through an arcuate zone adjacent said inner drum along the path of travel of the outer drum periphery for withdrawing bean clusters from said fins and separating the same into individual beans and for dislodging any beans lodged between said rods.

4. In a string bean grader, the combination of an outer rotary drum having an open feed and a discharge end, means for supplying beans to said feed end, means supporting said outer drum for rotation about its axis with the feed end elevated slightly relative to the discharge end to progressively displace beans along the length of said outer drum toward said discharge end, the periphery of said outer drum comprising a circumferentially spaced series of elongated, longitudinally extending frame bars disposed parallel to the axis of the other drum and a plurality of circumferentially extending, axially spaced rods extending between said frame bars and forming a plurality of axially spaced grading rings having sized circumferentially elongated openings between adjacent pairs of said rods and bars permitting passage of string beans of selected widths therethrough, said grading rings being arranged in groups providing sized openings of progressively increasing widths in the direction of said discharge end, means for rotating said outer drum about its axis, radially inwardly along planes transverse to the axis of said outer drum, projecting fins extending inwardly from circumferentially aligned groups of said rods at intervals spaced axially of said outer drum for engaging with leading edges of said fins relative to the direction of travel thereof; beans and bean clusters in the lower region of said outer drum and elevating the same to an upper region wherein they are gravitationally discharged downwardly within the outer drum, an inner drum of smaller diameter than the radius of said outer drum disposed within said outer drum to one side of a vertical plane through the center of the outer drum for rotation about an axis parallel to and spaced radially from the axis of said outer drum of smaller diameter than the radius of said outer drum at a position closely adjacent the ascending paths of said fins, means for rotating said inner drum at a greater peripheral speed than said outer drum, and a helically arranged series of radially outwardly projecting spring wire fingers on said inner drum spaced axially thereof having a length to protrude through each of the sized openings of said outer drum to be swept during rotation of said inner drum through arcuate paths extending between said axially spaced fins and fully through said sized openings over at least a portion of the length of said sized openings for withdrawing bean clusters from said fins and separating the same into individual beams and for dislodging any beans lodged between said rods, shaker sieve means having sized openings therein disposed below said outer drum to receive any beans passing through the sized openings of said outer drum, means for activating said shaker sieve to cause the beans discharged thereon to move over the sized openings down toward a discharge end thereof, and fan means disposed below said shaker sieve and directed to force air at high speed upwardly along inclined axes through the sized openings of said shaker sieve to blow off any light debris commingled with the beans on said shaker sieve.

References Cited in the file of this patent

UNITED STATES PATENTS

| | | |
|---|---|---|
| 276,523 | Cornwall | Apr. 24, 1883 |
| 553,774 | Brakeley | Jan. 28, 1896 |
| 771,805 | Bloom | Oct. 11, 1904 |
| 1,384,494 | Stoner | July 12, 1921 |
| 1,450,145 | Ellenwood | Mar. 27, 1923 |
| 2,523,055 | Pizzo | Sept. 19, 1950 |
| 2,670,845 | Busack | Mar. 2, 1954 |
| 2,861,685 | Cordis | Nov. 25, 1958 |

FOREIGN PATENTS

| | | |
|---|---|---|
| 687,860 | Great Britain | Feb. 25, 1953 |